US008160457B2

(12) United States Patent  
McCaul et al.

(10) Patent No.: US 8,160,457 B2
(45) Date of Patent: Apr. 17, 2012

(54) PIN/TIA SYSTEM FOR USE IN FTTX APPLICATIONS

(75) Inventors: Simon McCaul, Bristol (GB); Stuart Millard, Bristol (GB)

(73) Assignee: Phyworks, Bristol (GB)

( * ) Notice: Subject to any disclaimer, the term of this patent is extended or adjusted under 35 U.S.C. 154(b) by 805 days.

(21) Appl. No.: 12/025,614

(22) Filed: Feb. 4, 2008

(65) Prior Publication Data

US 2008/0247766 A1    Oct. 9, 2008

Related U.S. Application Data

(60) Provisional application No. 60/887,909, filed on Feb. 2, 2007.

(51) Int. Cl.
H04B 10/06 (2006.01)

(52) U.S. Cl. ........ 398/202; 398/208; 398/209; 398/164; 398/135; 398/136; 398/137; 398/68; 398/71; 398/72; 398/100; 385/89; 385/90; 385/92; 385/93; 250/214 A; 250/214 AG; 250/214 R; 250/214 LA; 330/59; 330/308

(58) Field of Classification Search ............... 398/202, 398/208, 209, 210, 213, 214, 135, 136, 137, 398/138, 139, 128, 130, 79, 164, 158, 159, 398/100, 72, 68, 69, 59, 83, 71, 98, 99, 70; 385/88, 89, 90, 92, 93; 250/214 A, 214 AG, 250/214 R, 214 LA, 214 C; 330/59, 308
See application file for complete search history.

(56) References Cited

U.S. PATENT DOCUMENTS

| 2003/0099021 | A1  | 5/2003  | Heineke et al. |
| 2004/0022544 | A1* | 2/2004  | Case et al. .................... 398/137 |
| 2004/0228633 | A1* | 11/2004 | Kim et al. ..................... 398/100 |
| 2005/0031355 | A1* | 2/2005  | Shi et al. ....................... 398/147 |
| 2005/0063711 | A1* | 3/2005  | Rossi et al. ................... 398/198 |
| 2005/0100273 | A1* | 5/2005  | Kim et al. ....................... 385/24 |
| 2005/0191059 | A1* | 9/2005  | Swenson et al. .............. 398/159 |
| 2005/0226640 | A1  | 10/2005 | Audic et al. |
| 2006/0067710 | A1* | 3/2006  | Liu et al. ...................... 398/202 |
| 2007/0196112 | A1* | 8/2007  | Crews .......................... 398/202 |

FOREIGN PATENT DOCUMENTS

EP    1303063    4/2003

OTHER PUBLICATIONS

Patent Cooperation Treaty, International Search Report, dated Jun. 3, 2008, 3 pages.
International Search Report and Written Opinion, International Patent Application No. PCT/IB08/001849, mailed Dec. 17, 2008 (8 pages).

\* cited by examiner

Primary Examiner — Hanh Phan
(74) Attorney, Agent, or Firm — TIPS Group

(57) ABSTRACT

A system is disclosed for an improved ROSA that has increased sensitivity for permitting greater numbers of ONTs to be connected to an optical network per defined transmission line distances. The ROSA configuration includes a digital optical module with improved performance characteristics. This digital optical module has replaced a conventional photodiode with a PIN detector that is coupled with the TIA. The resulting digital optical module containing this PIN/TIA configuration when incorporated in a ROSA provides a single ROSA solution that will meet or exceed the ITU/IEEE FTTx standards for short and long distances under substantially all operating conditions.

20 Claims, 4 Drawing Sheets

PIN/TIA SYSTEM FOR USE IN FTTX APPLICATIONS

RELATED APPLICATIONS

The present application claims priority to provisional application 60/887,909, filed Feb. 2, 2007, which is incorporated in its entirety herein.

FIELD OF THE INVENTION

The present invention relates to systems used in the transmission and processing of optical signals. More specifically, the present invention relates to systems used in bi-directional optical sub-assemblies or tri-directional optical subassemblies used in the transmission and processing of optical signals.

BACKGROUND OF THE INVENTION

At present, there has been the development and deployment of optical communications systems to provide households with telephone services, Internet services, and cable television services. These systems are replacing the characteristic copper wire cable networks that have been used in the past.

In these optical communications systems, optical signals, whether analog or digital, are distributed from a central office over an optical distribution network ("ODN") to end users. At the endpoints of this network are optical network terminals ("ONTs") or optical network units ("ONUs") that convert the optical signals into electrical signals.

If the system is a fiber-to-the-premises ("FTTP") system, the ONT would be on the private property of the end user. However, in most other FTTx system configurations, the ONT is on public property. In all of these system configurations, the converted signals usually travel electrically between the ONT and end user devices.

The fiber-to-the-home ("FTTH" or more generally "FTTx") market is based on a passive optical network ("PON") that is used for the bi-directional transmission of data between optical line terminations ("OLTs") located at the central office and ONTs or ONUs located in or at the outside the homes or premises of end users. An example of a typical system that incorporates a PON, OLT, and ONUs is shown in FIG. 1, generally at 100.

Referring to FIG. 1, OLT 102 will serve as a system element that is located at the central office. The OLT terminates the line signals received from end users. OLT 102 is in bi-directional communication with PON 104. The PON includes a network that brings optical fiber cabling and signals all or most of the way to the end user. Depending on where the PON terminates, the network may be described as part of a fiber-to-the-curb ("FTTC"), fiber-to-the-building ("FTTB"), or FTTH system.

PON 104 bi-directionally connects to ONU #1 106, ONU #2 110, and ONU #3 114. Each of ONUs are shown connected to a single end user residence. More specifically, ONU #1 106 is connected to end user residence 108, ONU #2 110 is connected to end user residence 112, and ONU #3 114 is connected to end user residence 116. One of the main purposes of ONUs is to multiplex and demultiplex signals to and from a fiber transmission line from PON 104. Each ONU terminates an optical fiber line and converts the signal to a format suitable for distribution to end user equipment. When used for residential use, a single ONU can serve 1 to 500 dwellings.

The transmission standards for FTTx are based on the International Telecommunications Union ("ITU") Gigabit PON ("GPON") or Broadband PON ("BPON") specifications, and the IEEE Gigabit Ethernet PON ("GEPON") or Ethernet PON ("EPON") specifications. These standards are adopted on a regional basis and define the data rates as well as the interoperability with existing networks.

Currently, the gigabit standards for the gigabit Ethernet passive optical network ("GEPON") in Japan and the gigabit passive optical network ("GPON") in the United States are the leading the demand for 1.25-2.5 Gbps burst-mode transceivers for FTTx. The target sensitivity at an OLT or ONU transceiver is specified for each standard. For example, the GPON minimum sensitivity for each Class is specified as follows:

| Class A  | −21 dBm |
|----------|---------|
| Class B  | −21 dBm |
| Class B+ | −27 dBm |
| Class C  | −28 dBm |

The sensitivity of a receiver defines the maximum number of users and distances over which an ONU/OLT can operate and how economically a network can be implemented. Therefore, the more sensitive the receiver, the greater the number of users at a given distance.

As is seen above, Class C GPON system sensitivity is greater than Class A GPON sensitivity. Accordingly, Class C GPON system will handle a larger number of users per transmission line unit length.

The graph at FIG. 2, generally at 200, shows an example of the relationship between distance and the maximum number of ONTs (or ONUs) for alternative Classes A, B, and C. At 202, the number of ONTs that may be handled at a 7 km distance is shown. At 208, for Class A systems, it shows that a maximum of 16 ONTs may be handled; at 210, for Class B systems, it shows that a maximum of 40 ONTs may be handled; and, at 212, for Class C systems, a maximum of 101 ONTs may be handled.

At 204, the number of ONTs that may be handled at a 10 km distance is shown. At 214, for Class A systems, it shows that a maximum of 13 ONTs may be handled; at 216, for Class B systems, it shows that a maximum of 32 ONTs may be handled; and, at 218, for Class C systems, a maximum of 81 ONTs may be handled.

At 206, the number of ONTs that may be handled at a 20 km distance is shown. At 220, for Class A systems, it shows that a maximum of 6 ONTs may be handled; at 222, for Class B systems, it shows that a maximum of 15 ONTs may be handled; and, at 224, for Class C systems, a maximum of 39 ONTs may be handled.

There needs to be an improved circuit configuration for a receiver optical sub-assembly ("ROSA"), that will improve the quality of transmissions over both short and long distances so that sensitivity targets specified under the current standards are met or exceeded for a greater number of users to be connected to the system.

SUMMARY OF THE INVENTION

The present invention is directed to an improved ROSA that has improved transmission quality that results in sensitivity improvements that permit greater numbers of ONTs to be connected to an optical network per defined transmission line distances or runs. The configuration of the ROSA according to the present invention includes a digital optical module with improved performance characteristics. This digital optical module replaces a conventional photodiode with a positive intrinsic negative ("PIN") photodetector that is coupled with the transimpedance amplifier ("TIA"). The TIA is also configured with improved performance characteristics. The resulting digital optical module containing the PIN/TIA combination of the present invention when incorporated in a ROSA provides a single ROSA solution that will meet or exceed the ITU/IEEE FTTx standards for short and long distance applications under substantially all operating conditions.

The ROSA configured with the improved digital optical module of the present invention will operate in conjunction with other control devices, such as in a bi-directional optical sub-assembly ("BOSA") or a tri-directional optical sub-assembly ("Triplexer") optical modules and circuits configured to implement various operating effects, such as the reception and conversion of optical data signals.

An object of the present invention is to provide an improved ROSA that may be used in a BOSA or Triplexer to increase the number of ONTs that may be connected to an optical network per unit transmission distance.

Another object of the present invention is to provide an improved ROSA that may be used in a BOSA or Triplexer that has a digital optical module with improved performance characteristics to increase the number of ONTs that may be connected to an optical network per unit transmission distance.

A further object of the present invention is to provide an improved ROSA that may be used in a BOSA or Triplexer that has a digital optical module that includes a PIN/TIA combination that provides improved transmission quality resulting in improved sensitivity to increase the number of ONTs that may be connected to an optical network per unit transmission distance.

These and other objects of the invention will be described in greater detail in the remainder of the specification referring to the drawings.

DESCRIPTION OF THE INVENTION

The present invention is an improved ROSA that has a digital optical module with improved performance characteristics. The digital optical module of the ROSA includes a novel PIN/TIA combination that improves transmission quality thereby increasing receive sensitivity of the ROSA. The improved ROSA may be configured in a BOSA, a Triplexer, another type of optical signal transceiver, or an optical signal receiver and still be within the scope of the present invention. A ROSA that is configured with the digital optical module with improved performance characteristics of the present invention provides an optical system element that meets and exceeds the ITU/IEEE FTTx standards for short and long distances under substantially all operating conditions.

Figure 1:
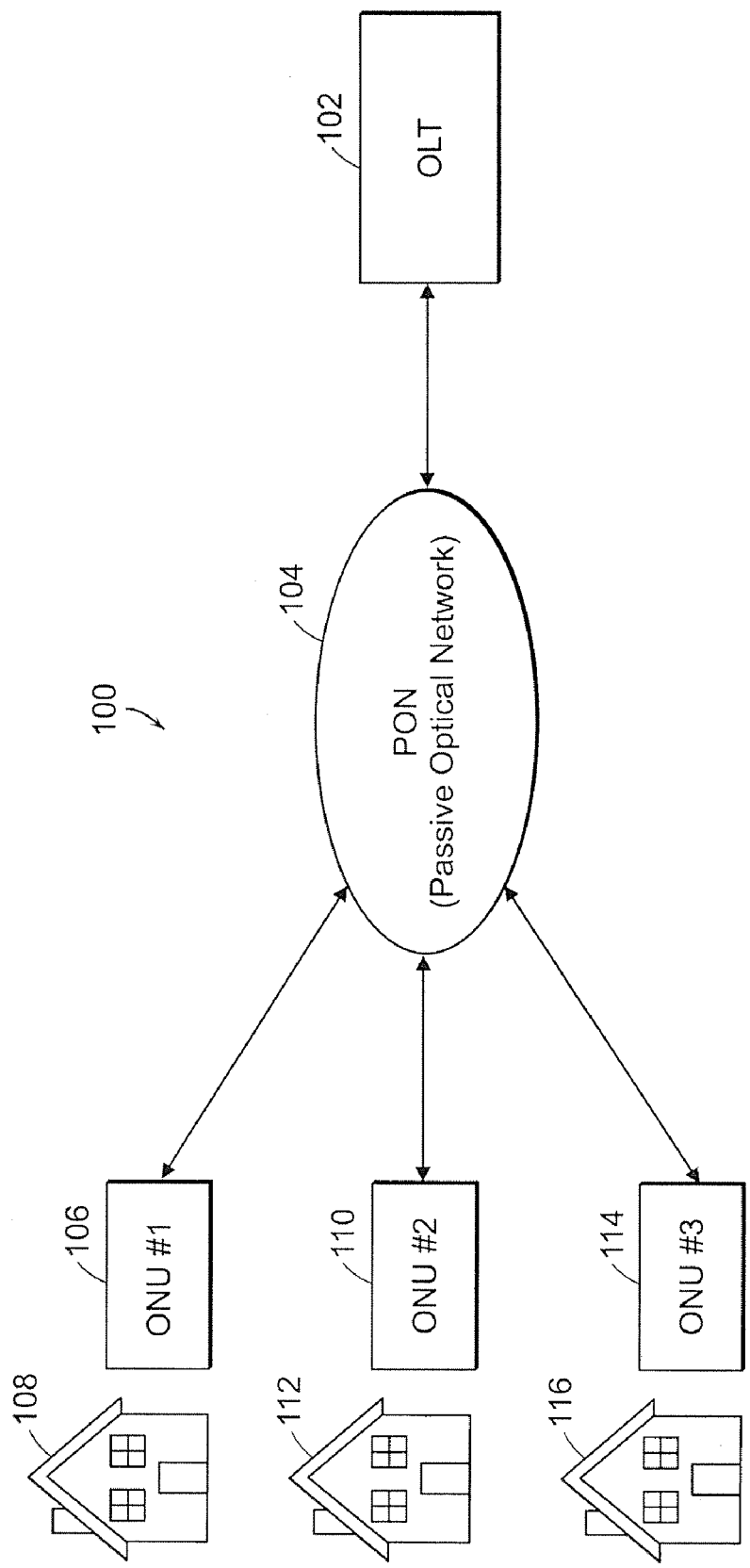
FIG. 1 shows a representative drawing of an optical network for transmission of digital and analog optical signals between a central station and end user residences.
Figure 2:
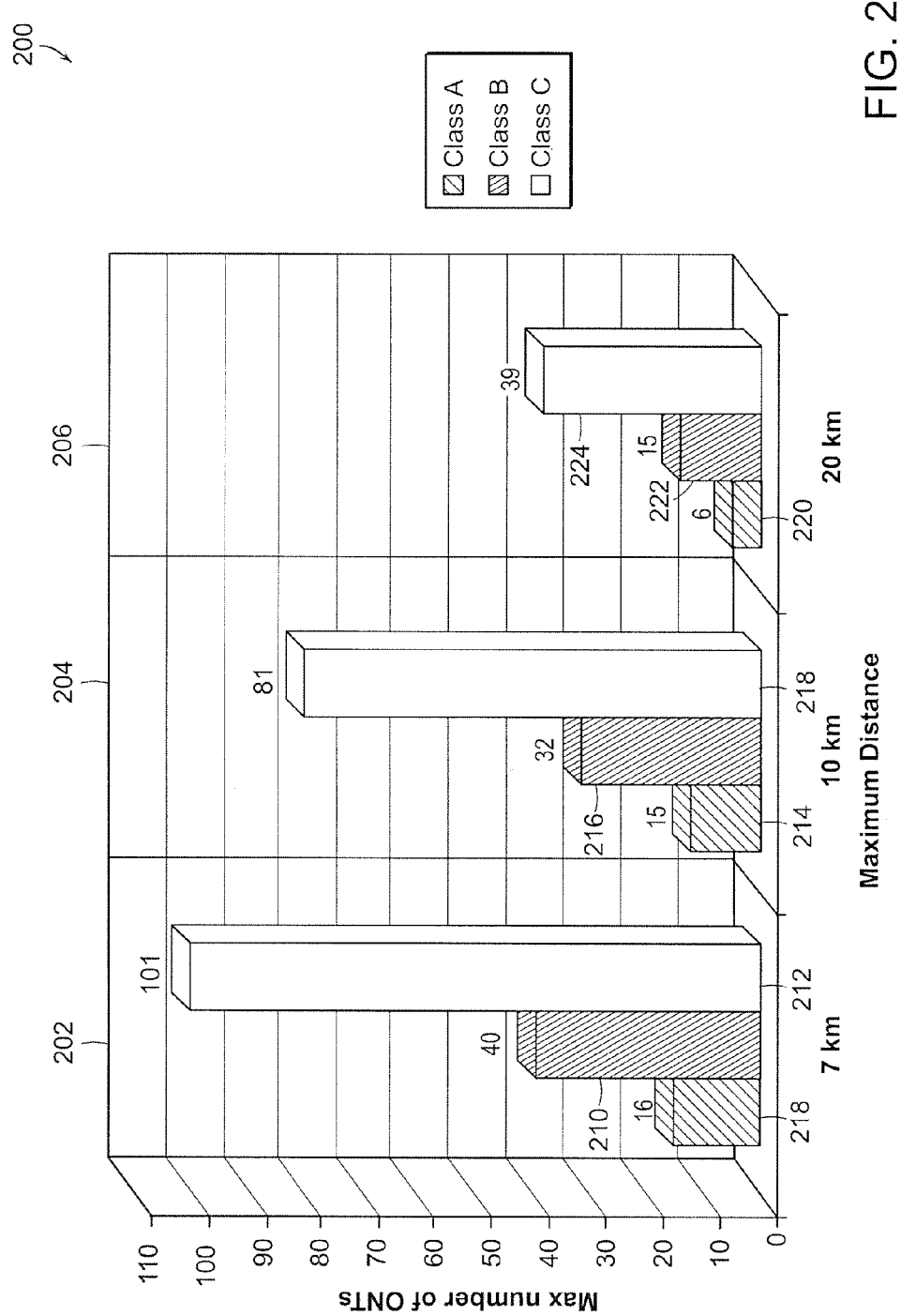
FIG. 2 shows a graph of a current relationship between transmission line distance or runs and the maximum number of ONTs that may be supported by an optical network based on alternative ITU ODN Classes.
Figure 3:
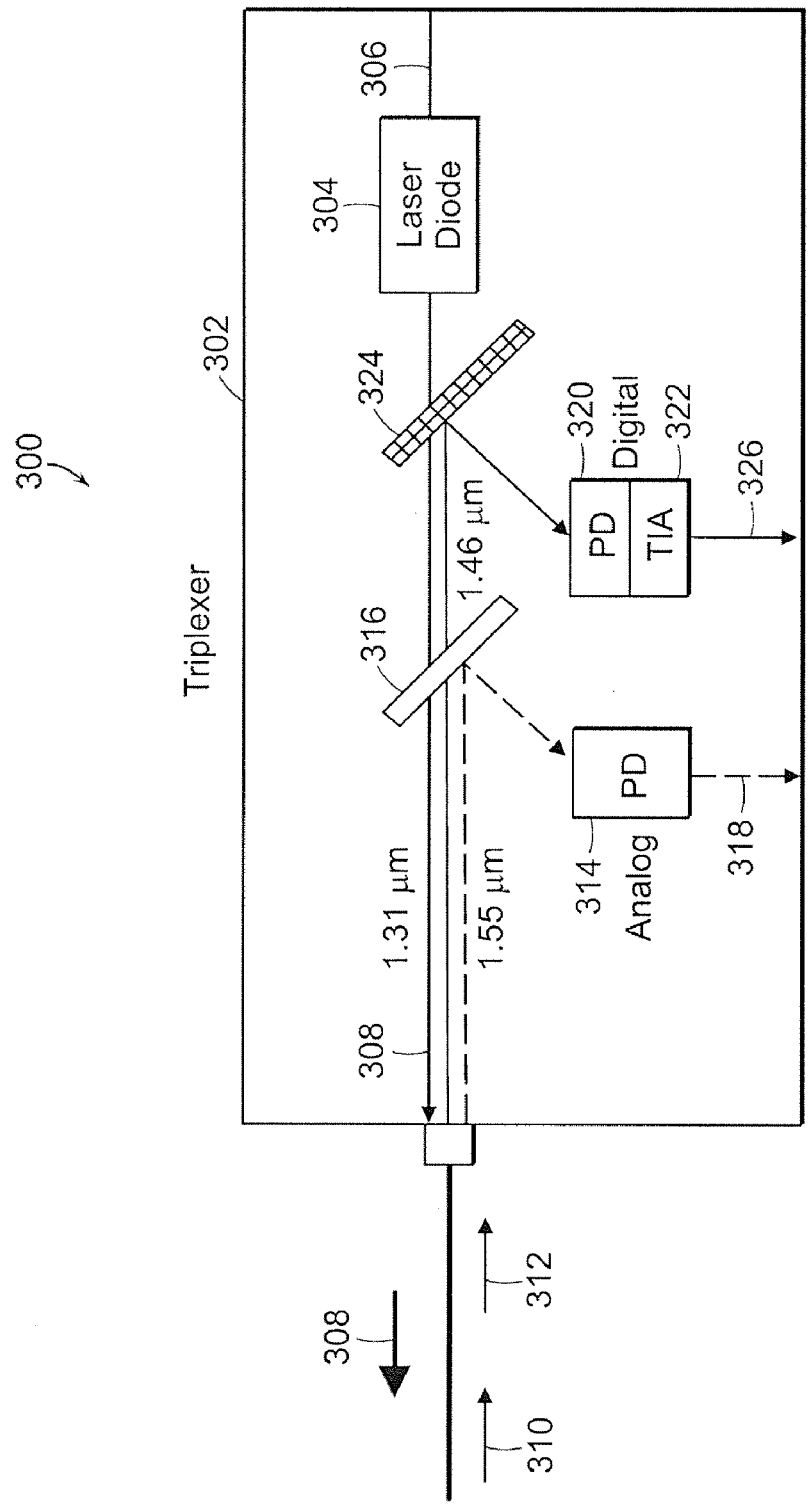
FIG. 3 shows a representative drawing of a Triplexer.

Typically, an ONU will include a ROSA or receiving module that is incorporated in a BOSA or Triplexer. Referring to FIG. 3, generally at 300, a conventional Triplexer is shown. Triplexer 302 includes laser diode 304 for transmission of optical digital signals upstream from the ONU at a specific frequency, typically 1.31 μm. For example, digital signals received from residence 108 on line 306 would be converted to optical signals by laser diode 304. The transmission path of the converted signals would be on line 308 to PON 104.

Signals being received from PON 104 may be optical analog or optical digital signals. As shown in FIG. 3, the optical digital signals are transmitted to Triplexer 302 on line 310 and the optical analog signals on line 312.

Photodiode 314 receives the optical analog signal on line 312 after they have been reflected by frequency sensitive mirror element 316. Optical analog signals, such as video signals, are transmitted at a specific frequency, typically 1.55 μm. The converted analog signals are output from photodiode 314 on line 318.

Photodiode 320 with an embedded TIA 322 receives the optical digital signals on line 310 after they have been reflected by frequency sensitive mirror element 324. The optical digital signals are transmitted at a specific frequency, typically 1.49 μm. The converted digital signals are output from TIA 322 on line 326.

Figure 4:
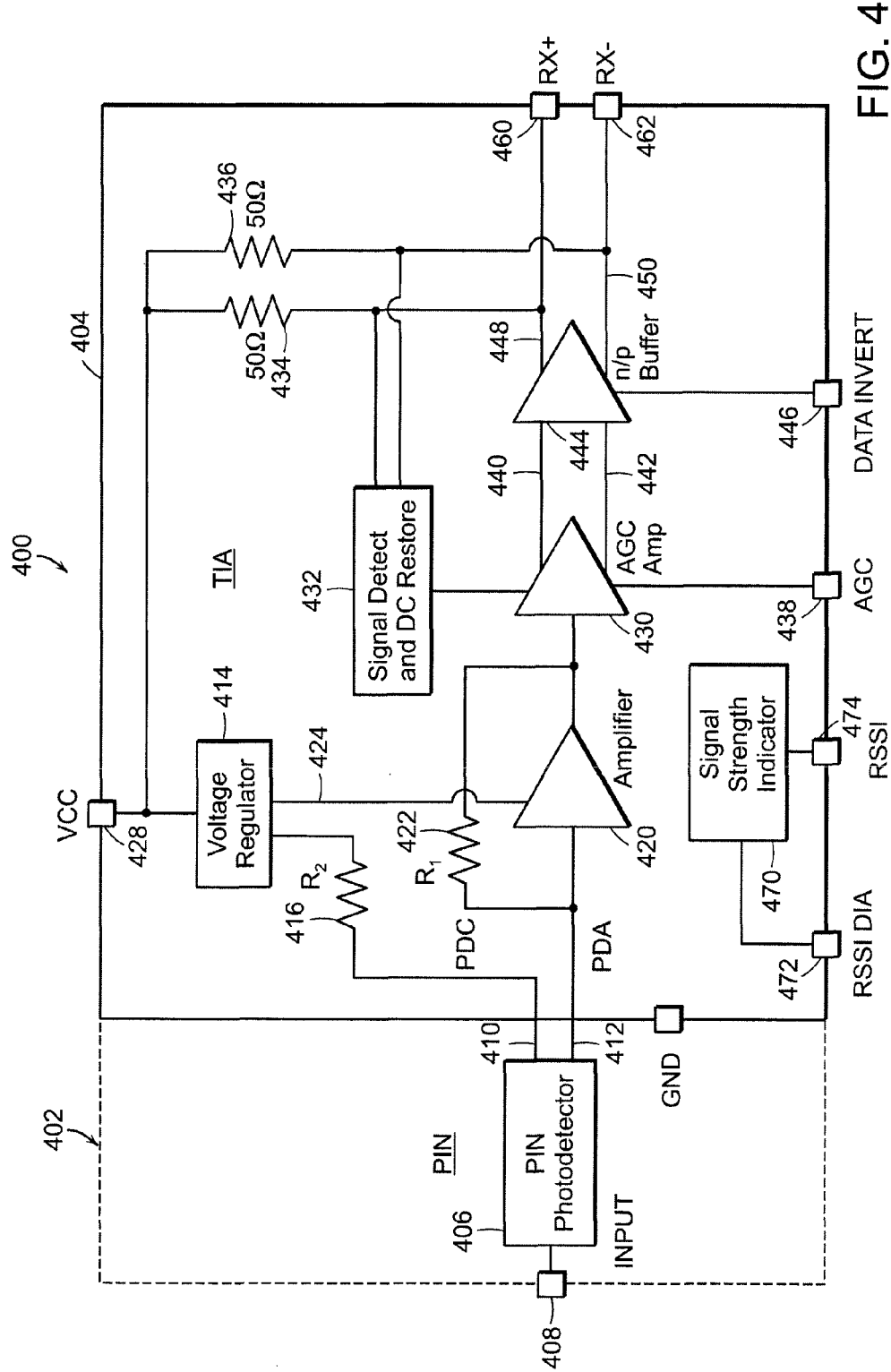
FIG. 4 shows a schematic block diagram of the digital optical module according to the present invention.

It is understood that the digital optical module shown generally at 400 in FIG. 4 would replace the digital optical module (320/322) shown in FIG. 3 to provide the Triplexer 302 with the advantages of the present invention. This understanding would apply to any other type of optical signal transceiver or receiver.

Referring to FIG. 4, generally at 400, the elements of the PIN/TIA combination according to the present invention will be described. Digital optical module 400 includes PIN section 402 and TIA section 404. PIN section 402 includes PIN photodetector 406. The signal input to PIN photodetector 406 from node 408 will be the optical digital signal received from PON 104, such as signal 310 received by Triplexer 302 in FIG. 3. PIN photodetector 406 preferably is a PDCS80T-XS 2.5 Gbps PIN photodiode manufactured by Albis Opto Electronics, AG.

PIN photodetector 406 will process the input digital optical signal and convert it to electrical outputs 410 and 412. The signal on line 410 is the photodetector cathode ("PDC") signal and the signal on line 412 is the photodetector anode ("PDA") signal. The PDC signal will be more negative than the PDA signal.

The PDC signal connects to voltage regulator 414 through resistor 416. Voltage regulator 414 has its input connected to $V_{cc}$ node 428. The PDA signal connects to amplifier 420. The PDA signal also is connected in a feedback loop with amplifier 420. The feedback loop includes resistor 422. Resistor 416 and 422 are matched resistors. These resistors are matched because unmatched resistors would produce a DC offset at the input of the photodiode resulting in distortion of the photodiode signal during later amplification stages. The output of voltage regulator 414 on line 424 is input to amplifier 420 to control the amplifier.

The output of the amplifier 420 will be the amplified PDA signal as conditioned by the feedback loop that includes resistor 422. This amplified output from amplifier 420 is input to automatic gain control ("AGC") amplifier 430. AGC amplifier 430 connects to signal detect and DC restore circuit 432.

The inputs to circuit 432 are the pair of $V_{CC}$ signals processed by matched resistors 434 and 436. As shown in FIG. 4, each of these resistors is a 50 ohm resistor. However, it is understood that other resistor values may be used and still be within the scope of the present invention. The purpose of the signal detect and DC restore circuit is to sense the signal at the RX+/− outputs and maintain the required DC level in providing an input to AGC amplifier 430.

AGC amplifier 430 also is connected to AGC node 438. The AGC node connects to a disabling function for the AGC, which provides a selectable AGC on/off for the purpose of the AGC amplifier 430 processing the signal input from amplifier 420.

The outputs of AGC amplifier 430 are the signals at 440 and 442. The signal at 440, after additional processing, will be the RX+ serial data signal output from TIA section 404 at node 460. Similarly, the signal at 442, after additional processing, will be the RX− serial data signal output from TIA section 404 at node 462.

The signals output from AGC amplifier 430 on lines 440 and 442 are input to output buffer 444. The control input to output buffer 444 is the signal from DATA INVERT node 446. DATA INVERT node 446 provides an inverting function for controlling the signals output from the buffer that connect to RX+/− nodes 460 and 462, respectively.

There are two outputs from output buffer 444. These are the output on line 448 and the output on line 450. The output on line 448 connects to RX+ node 460 and the output on line 450 connects to RX− node 462. Each of these outputs signals is connected to the $V_{CC}$ signal after processing by a 50 ohm resistor. The purpose of connecting the outputs of output buffer 444 to $V_{CC}$ is to raise the signal levels of the signals so that they will achieve the correct output swing range and control of the AGC. This signal pair is output from RX+ node 460 and RX− node 462 as the serial data output from digital optical module 400.

Also shown in TIA segment 404 is signal strength indicator 470. Signal strength indicator 470 is connected to RSSI DIR node 472 and RSSI node 474. RSSI DIR node 472 typically connects to ground or open-circuit to specify the RSSI current direction and RSSI node 474 typically connects to photodiode for biasing it.

Having described the novel configuration of digital optical module of the present invention, its features will now be described.

PIN photodiodes have been used with TIAs in the past when it was thought the transmission line was only to be run over short distances between the ROSA and end user devices at his/her premises. In this context, short transmission line distances or runs means sensitivity levels up to a minimum sensitivity of −26 dBm. As transmission line distances or runs became longer, PIN photodiodes were replaced with Avalanche photodiodes ("APDs") because of their improved sensitivity. When referring to long transmission distances or runs, it is meant to mean distances or runs with sensitivity levels up to a minimum sensitivity of −30 dBm. The PIN/TIA configuration that is shown in FIG. 4, generally at 400, provides performance characteristics that have advantages over conventional PIN/TIA and APD/TIA configurations when used for both short and long transmission line distances or runs.

The performance characteristics of the PIN/TIA configuration shown in FIG. 4 at 400 are improved over short distances because the configuration requires less launch power from the OLT. For example, a typical launch power that would be required for a conventional PIN/TIA would be +3 dB; however, the launch power for the PIN/TIA would be +1 dB. This difference in a launch power results in improved transmission quality resulting in improved sensitivity without requiring the increased complexity of an APD in combination with the TIA.

The improved transmission quality and resulting increased sensitivity for use over short transmission line distances or runs also will enable more splits of the signal to take place. In the past, short transmission line distances or runs were expected to support a number of splits in the range of 16. When the PIN/TIA combination of the present invention is used, this range has been found to be increased to 32 or 64. This will enable more end users to be connected to an optical network without increasing the amount of system equipment.

The PIN/TIA combination of the present invention that is shown in FIG. 4, generally at 400, also will attenuate large optical signals that are received so there is a reduction in the possibility of overload at the receiver that distorts the signal. Conventional APD/TIAs have conventional attenuation characteristics for large optical signals in the range of +6 dBm. In contrast, the attenuation characteristics of PIN/TIA 400 are approximately 0 dBm. It is seen that there is a significant operational advantage in using the digital optical module of FIG. 4.

With regard to the attenuation of large signals, there was no advantage to using conventional APD/TIA configurations. This is because these configurations do not attenuate large signals in a manner that approaches what is accomplished by the configuration of the present invention. In fact, such APD/TIA configurations would further restrict short distance applications by having unnecessarily complex designs that substantively increase the possibility of overload and signal distortion.

When the PIN/TIA configuration shown at 400 in FIG. 4 is used for long transmission line distances or runs, there is increased transmission quality and sensitivity when compared to conventional PIN/TIA and APD/TIA configurations.

The performance characteristics of the PIN/TIA of the present invention as shown in FIG. 4 is capable of sensing signals beyond the minimum specification requirements over substantially all production and application variations. For example, the production and application variations may include variations over voltage/temperature, attenuation by a Triplexer filter, losses from the receiver packaging and electrical crosstalk. Conventional PIN/TIAs have not done this because they were not capable of meeting the required performance levels for at least higher data rates in FTTx applications because of the noise associated with long transmission line distances or runs. These improvements in production and application variations are shown by the following variation in Triplexer sensitivity equal to or less than 1.5 dBm over voltage and temperature variations.

The substitution of a conventional APD/TIA for a conventional PIN/TIA configuration also does not adequately address the problem associated with production and application variations as they affect long transmission line distances and runs. When an APD/TIA was used in these situations, the circuit configuration became more complex and susceptible to increased performance variations due to the amplification characteristics of the APD as compared to a conventional PIN/TIA configuration. Therefore, the improvements of the present invention are even more pronounced with regard to APD/TIA configuration.

As mentioned previously, improved performance characteristics, including sensitivity, will permit greater numbers of ONTs to be connected to an optical network for the alternative ITU ODN Classes per transmission line length. The standard performance characteristics that the PIN/TIA configuration of the present invention improve upon, include but are not limited to, what is shown in the following table:

TABLE

| Parameter | Conditions | Min | Typ | Max | Unit |
|---|---|---|---|---|---|
| High-speed data input rate | $C_{IN} = 0.35$ pF | | | 2.5 | Gbps |
| Sensitivity | $C_{IN} = 0.35$ pF, Responsivity = 0.7 A/W, BER = $10^{-10}$, ER = 10 dB, using PRBS31 | −30.0 | −31.1 | | dBm |
| Input overload | DJ within spec | | | 0 | dBm |

Noting the foregoing improvements in performance characteristics over both short and long transmission line distances or runs, the sensitivity of the PIN/TIA configuration of the present invention shown at 400 is in the range of −31 dBm (typical), which is a −3 dBm improvement over conventional digital optical modules used in either of these applications.

The terms and expressions that are used herein are meant for description not limitation. It being recognized that there may be minor changes or modifications that must take place and be within the scope of the present invention.

The invention claimed is:

1. An improved optical receiver component for use with long transmission distances in a passive optical network ("PON"), comprising:
   a positive intrinsic negative ("PIN") photodetector for receiving optical digital signals and converting the digital optical signals to electrical signals;
   a transimpedance amplifier ("TIA") section that is connected to the PIN photodetector for processing the electrical signals output from the PIN photodetector to produce at its output a pair of amplified electrical signals representative of digital optical signals input to the PIN photodetector, wherein the TIA section includes
      (i) an amplifier; and
      (ii) a voltage regulator coupled to the PIN photodetector, the voltage regulator providing an output to the amplifier to control the amplifier;
   a first frequency sensitive mirror element interposed between an optical inlet and the PIN photodetector to selectively reflect optical digital signals to the PIN photodetector;
   an analog photodetector for receiving optical analog signals and converting the analog optical signals to analog electrical signals;
   a second frequency sensitive mirror element interposed between the optical inlet and the analog photodetector to selectively reflect optical analog signals to the analog photodetector; and
   a laser diode arranged to output light through the first frequency sensitive mirror element and the second frequency sensitive mirror element and out through the optical inlet responsive to an external digital signal;
   whereby the combination of the PIN photodetector and the TIA section includes an improved transmission sensitivity at least below −28 dBm.

2. The improved optical receiver component of claim 1, wherein the TIA section includes being embedded as part of the PIN photodetector.

3. The improved optical receiver component of claim 1, wherein the PIN photodetector outputs an anode signal on an anode and a outputs cathode signal on a cathode, wherein the cathode signal is input to the voltage regulator and the anode signal is input to the amplifier of the TIA section.

4. The improved optical receiver component of claim 3, wherein a first resistor is coupled between the cathode and the voltage regulator, and a second resistor is coupled between an output of the amplifier and an input of the amplifier in a feedback path, wherein the first resistor and the second resistor have substantially the same resistance value.

5. The improved optical receiver component of claim 4, wherein the output of the amplifier is coupled to an automatic gain control (AGC) amplifier, and wherein a signal detect and DC restore circuit senses the amplified output signals of the TIA section and provides an input to the AGC amplifier based on the amplified output signals to maintain a required DC level in the amplified output signals.

6. The improved optical receiver component of claim 5, wherein the voltage regulator is coupled to a voltage supply, and wherein the signal detect and DC restore circuit is connected to the amplified output signals by sensing leads, wherein the sensing leads are connected to the voltage supply by at least one resistor.

7. The improved optical receiver component of claim 1, wherein the combination of the PIN photodetector and the TIA section has an improved transmission sensitivity at least equal to or below −31 dBm.

8. An integrated circuit that includes an optical receiver component for receiving digital optical signals with long transmission distances in a PON, comprising:
   a positive intrinsic negative ("PIN") photodetector for receiving optical digital signals and converting the digital optical signals to electrical signals;
   a transimpedance amplifier ("TIA") section that is connected to the PIN photodetector for processing the electrical signals output from the PIN photodetector to produce at its output a pair of amplified electrical signals representative of digital optical signals input to the PIN photodetector, wherein the TIA section includes
      (i) an amplifier; and
      (ii) a voltage regulator coupled to the PIN photodetector, the voltage regulator providing an output to the amplifier to control the amplifier;
   a first frequency sensitive mirror element interposed between an optical inlet and the PIN photodetector to selectively reflect optical digital signals to the PIN photodetector; and
   a laser diode arranged to output light through the first frequency sensitive mirror element and out through the optical inlet responsive to an external digital signal;
   whereby the combination of the PIN photodetector and the TIA section includes an improved optical signal transmission quality and achieving at least an improved PIN/TIA sensitivity at least below −28 dBm.

9. The integrated circuit of claim 8, wherein the TIA section includes being embedded as part of the PIN photodetector.

10. The integrated circuit of claim 8, wherein the PIN photodetector outputs an anode signal on an anode and a outputs cathode signal on a cathode, wherein the cathode signal is input to the voltage regulator and the anode signal is input to the amplifier of the TIA section.

11. The integrated circuit of claim 10, wherein a first resistor is coupled between the cathode and the voltage regulator, and a second resistor is coupled between the output of the amplifier and the input of the amplifier in a feedback path, wherein the first resistor and the second resistor have substantially the same resistance value.

12. The integrated circuit of claim 11, wherein the output of the amplifier is coupled to an automatic gain control (AGC) amplifier, and wherein a signal detect and DC restore circuit senses the amplified output signals of the TIA section and provides an input to the AGC amplifier based on the amplified output signals to maintain a required DC level in the amplified output signals.

13. The integrated circuit of claim 8, wherein the combination of the PIN photodetector and the TIA section has an improved PIN/TIA sensitivity at least equal to or below −31 dBm.

14. The integrated circuit of claim 8, further comprising:
an analog photodetector for receiving optical analog signals and converting the analog optical signals to analog electrical signals; and
a second frequency sensitive mirror element interposed between the optical inlet and the analog photodetector to selectively reflect optical analog signals to the analog photodetector;
wherein the laser diode is arranged to output light through the second frequency sensitive mirror element.

15. An improved digital optical module for use in a receiver optical subassembly ("ROSA") with long transmission distances in a PON, comprising:
a positive intrinsic negative ("PIN") photodetector for receiving optical digital signals and converting the digital optical signals to electrical signals;
a transimpedance amplifier ("TIA") section that is connected to the PIN photodetector for processing the electrical signals output from the PIN photodetector to produce at its output a pair of amplified electrical signals representative of digital optical signals input to the PIN photodetector, wherein the TIA section includes
(i) an amplifier; and
(ii) a voltage regulator coupled to the PIN photodetector, the voltage regulator providing an output to the amplifier to control the amplifier;
whereby, the combination of the PIN photodetector and the TIA section includes an improved production and application sensitivity to variations to less than 1.5 dBm.

16. The improved digital optical module of claim 15, wherein the combination of the PIN photodetector and the TIA section has an improved transmission sensitivity at least below −28 dBm.

17. The improved digital optical module of claim 15, wherein the PIN photodetector outputs an anode signal on an anode and a outputs cathode signal on a cathode, wherein the cathode signal is input to the voltage regulator and the anode signal is input to the amplifier of the TIA section.

18. The improved digital optical module of claim 17, wherein a first resistor is coupled between the cathode and the voltage regulator, and a second resistor is coupled between the output of the amplifier and the input of the amplifier in a feedback path, wherein the first resistor and the second resistor have substantially the same resistance value.

19. The improved digital optical module of claim 17, wherein the output of the amplifier is coupled to an automatic gain control (AGC) amplifier, and wherein a signal detect and DC restore circuit senses the amplified output signals of the TIA section and provides an input to the AGC amplifier based on the amplified output signals to maintain a required DC level in the amplified output signals.

20. The improved digital optical module of claim 15, wherein the combination of the PIN photodetector and the TIA section has an improved transmission sensitivity at least equal to or below −31 dBm.

* * * * *